United States Patent
Agarwal et al.

(10) Patent No.: US 11,129,034 B2
(45) Date of Patent: Sep. 21, 2021

(54) LINK LATENCY AND SYSTEM BEHAVIOR

(71) Applicant: NOKIA SOLUTIONS AND NETWORKS OY, Espoo (FI)

(72) Inventors: Tarun Agarwal, Palatine, IL (US); Mark Spiotta, Cracow (PL); Dariusz Palka, Cracow (PL)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 117 days.

(21) Appl. No.: 16/324,687

(22) PCT Filed: Aug. 12, 2016

(86) PCT No.: PCT/US2016/046782
§ 371 (c)(1),
(2) Date: Feb. 11, 2019

(87) PCT Pub. No.: WO2018/031033
PCT Pub. Date: Feb. 15, 2018

(65) Prior Publication Data
US 2019/0268789 A1   Aug. 29, 2019

(51) Int. Cl.
*H04W 24/08* (2009.01)
*H04B 17/364* (2015.01)
*H04L 1/00* (2006.01)

(52) U.S. Cl.
CPC .......... *H04W 24/08* (2013.01); *H04B 17/364* (2015.01); *H04L 1/00* (2013.01)

(58) Field of Classification Search
None
See application file for complete search history.

(56) References Cited

U.S. PATENT DOCUMENTS

| 7,680,074 B2 | 3/2010 | Xu et al. |
| 9,370,025 B1 | 6/2016 | Singh et al. |

(Continued)

FOREIGN PATENT DOCUMENTS

| CN | 101282173 A | 10/2008 |
| CN | 102124813 A | 7/2011 |
| CN | 101282173 B | 4/2012 |
| CN | 103107849 A | 5/2013 |
| CN | 104918317 A | 9/2015 |
| WO | 2015126771 A1 | 8/2015 |

OTHER PUBLICATIONS

Clerckx, Bruno et al.: "Coordinated Multi-Point Transmission in Heterogeneous Networks: A Distributed Antenna System Approach", Circuits and Systems (MWSCAS), 2011 IEEE 54th International Midwest Symposium on, IEEE, Aug. 7, 2011, pp. 1-4.

(Continued)

*Primary Examiner* — Ruihua Zhang
(74) *Attorney, Agent, or Firm* — Squire Patton Boggs (US) LLP

(57) ABSTRACT

Various communication systems may benefit from improved wireless communications. For example, communication systems may benefit from a wireless broadband network that monitors and detects link latency. A method includes detecting latency information of data being transmitted on at least one link between a first base station and at least one second base station. In addition, the method includes forming at least one array comprising the latency information of the data. Further, the method includes modifying a system behavior relating to at least the first base station or the at least one second base station based on the at least one array.

15 Claims, 4 Drawing Sheets

(56) References Cited

U.S. PATENT DOCUMENTS

| | | | |
|---|---|---|---|
| 10,165,467 B2* | 12/2018 | Papa | H04L 12/4633 |
| 2004/0166809 A1* | 8/2004 | Dickey | H04B 17/26 |
| | | | 455/67.11 |
| 2005/0227689 A1 | 10/2005 | Jewett | |
| 2006/0183488 A1 | 8/2006 | Billhartz | |
| 2010/0317343 A1* | 12/2010 | Krishnamurthy | H04L 43/0852 |
| | | | 455/435.1 |
| 2011/0096732 A1 | 4/2011 | Rashid et al. | |
| 2013/0122830 A1 | 5/2013 | Wang et al. | |
| 2013/0273854 A1 | 10/2013 | Zhang et al. | |
| 2015/0036608 A1* | 2/2015 | Morita | H04L 1/1861 |
| | | | 370/329 |
| 2015/0326307 A1* | 11/2015 | Sawai | H04B 7/2606 |
| | | | 370/315 |
| 2016/0073426 A1* | 3/2016 | Bull | H04W 72/0426 |
| | | | 370/336 |
| 2016/0309490 A1* | 10/2016 | Huang | H04W 72/085 |
| 2016/0359592 A1* | 12/2016 | Kulshreshtha | G06F 16/17 |
| 2017/0181035 A1* | 6/2017 | Gao | H04W 76/15 |

OTHER PUBLICATIONS

Kurras, Martin et al., "Achievable System Performance Gains Using Distributed Antenna Deployments", 2012 IEEE 23rd International Symposium on Personal, Indoor and Mobile Radio Communications (PIMRC 2012) : Sydney, Australia, September 9-12, 2012, IEEE, Piscataway, NJ Sep. 9, 2012, pp. 143-148.

Apr. 17, 2020 Partial Supplementary Search Report issued in European Patent Application No. 16912846.9.

International Search Report & Written Opinion dated Oct. 28, 2016 corresponding to International Patent Application No. PCT/US2016/046782.

Chinese Office Action corresponding to CN Application No. 201680088402.9, dated Nov. 26, 2020.

Indian Office Action corresponding to IN Application No. 201947004753, dated Jan. 13, 2021.

Chinese Office Action with English language summary, corresponding to CN Application No. 201680088402.9, dated Jun. 28, 2021.

* cited by examiner

LINK LATENCY AND SYSTEM BEHAVIOR

BACKGROUND

Field

Various communication systems may benefit from improved wireless communications. For example, communication systems may benefit from a wireless broadband network that monitors and detects link latency.

Description of the Related Art

Wireless networks are operated using a series of network nodes or base stations that are deployed according to a network plan to provide a desired network coverage and capacity. One way to enhance network coverage may be to add a number of new cells or network nodes. In an indoor environment, coverage expansion may include the addition of new picocells or microcell. A microcell or a picocell can be a small cellular base station that is typically used to cover a limited or small area. A microcell can generally be larger than a picocell.

One example of a wireless network may be a single frequency network (SFN) in which all the transmitters from one cell are broadcast over the same frequency. Single frequency networks may include supercells in which a single logical cell includes an SFN master and at least one physical microcell or picocell in the form of an SFN Antenna (SFN ANT). A high speed, low latency link, such as an aggregation switch, may connect the SFN master to the SFN ANTs. In one example, the high speed may be greater than 1 gigabyte per second (gbps), and the low latency may be equal to or lower than 100 micro seconds ($\mu s$). High latency may mean that data on the link may be arriving later or slower than an acceptable predetermined time, for example 100 $\mu s$.

High latency in data transmissions between the SFN master and SFN ANTs may act to drastically decrease the performance of the SFN. In one instance, high latency may lead an SFN ANT to be dropped from the SFN cell. In other words, SFN ANTs that send or receive messages late or at a high latency may no longer be allowed to serve a user equipment or mobile terminal. As a result, the user equipment or mobile terminal may need to be served by a suboptimal SFN ANT, which in turn will decrease the end users experience.

SUMMARY

A method in certain embodiments, may include detecting latency information of data being transmitted on at least one link between a first base station and at least one second base station. The method may also include forming at least one array comprising the latency information of the data. In addition, the method may include modifying a system behavior relating to at least the first base station or the at least one second base station based on the at least one array.

According to certain embodiments, an apparatus may include at least one memory including computer program code, and at least one processor. The at least one memory and the computer program code may be configured, with the at least one processor, to cause the apparatus at least to detect latency information of data being transmitted on at least one link between a first base station and a second base station. The at least one memory and the computer program code may also be configured, with the at least one processor, at least to form at least one array comprising the latency information of the data. In addition, the at least one memory and the computer program code may be configured, with the at least one processor, at least to modifying a system behavior relating to at least the first base station or the at least one second base station based on the at least one array.

An apparatus, in certain embodiments, may include means for detecting latency information of data being transmitted on at least one link between a first base station and at least one second base station. The apparatus may also include means for forming at least one array comprising the latency information of the data. In addition, the apparatus may include means for modifying a system behavior relating to at least the first base station or the at least one second base station based on the at least one array.

According to certain embodiments, a non-transitory computer-readable medium encoding instructions that, when executed in hardware, perform a process. The process may include detecting latency information of data being transmitted on at least one link between a first base station and at least one second base station. The process may also include forming at least one array comprising the latency information of the data. Further, the process may include modifying a system behavior relating to at least the first base station or the at least one second base station based on the at least one array.

According to certain embodiments, a computer program product encoding instructions for performing a process according to a method including detecting latency information of data being transmitted on at least one link between a first base station and at least one second base station. The method may also include forming at least one array comprising the latency information of the data. In addition, the method may include modifying a system behavior relating to at least the first base station or the at least one second base station based on the at least one array.

A method, in certain embodiments, may include sending data from at least one second base station to a first base station via at least one link. The method can also include receiving a message including control information from the first base station. The control information includes instructions for modifying system behavior based on at least one array comprising latency information of the data sent on the at least one link. In addition, the method may include modifying the system behavior based on the received message from the first base station.

According to certain embodiments, an apparatus may include at least one memory including computer program code, and at least one processor. The at least one memory and the computer program code may be configured, with the at least one processor, to cause the apparatus at least to send data from at least one second base station to a first base station via at least one link. The at least one memory and the computer program code may also be configured, with the at least one processor, to cause the apparatus at least to receive a message including control information from the first base station. The control information includes instructions for modifying system behavior based on at least one array comprising latency information of the data sent on the at least one link. In addition, the at least one memory and the computer program code may be configured, with the at least one processor, to cause the apparatus at least to modify the system behavior based on the received message from the first base station.

An apparatus, in certain embodiments, may include means for sending data from at least one second base station to a first base station via at least one link. The apparatus may also include means for receiving a message including control information from the first base station. The control information includes instructions for modifying system behavior based on at least one array comprising latency information of the data sent on the at least one link. In addition, the apparatus may include means for modifying the system behavior based on the received message from the first base station.

According to certain embodiments, a non-transitory computer-readable medium encoding instructions that, when executed in hardware, perform a process. The process may include sending data from at least one second base station to a first base station via at least one link. The process may also include receiving a message including control information from the first base station. The control information includes instructions for modifying system behavior based on at least one array comprising latency information of the data sent on the at least one link. In addition, the process may include modifying the system behavior based on the received message from the first base station.

According to certain embodiments, a computer program product encoding instructions for performing a process according to a method including sending data from at least one second base station to a first base station via at least one link. The method may also include receiving a message including control information from the first base station. The control information includes instructions for modifying system behavior based on at least one array comprising latency information of the data sent on the at least one link. In addition, the method may include modifying the system behavior based on the received message from the first base station.

BRIEF DESCRIPTION OF THE DRAWINGS

For proper understanding of the invention, reference should be made to the accompanying drawings, wherein.

DETAILED DESCRIPTION

Certain embodiments can monitor a link between a first base station, for example an SFN master, and a second base station, for example, an SFN ANT. Certain embodiments may also be used to detect latency or changes in the link, and modify the behavior of the system based on an array of the detected latency. Although many of the embodiments below are explained as relating to links between an SFN master and SFN ANTs, such embodiments are merely exemplary. Other embodiments may not be limited to an SFN environment, and may involve other applications such as a cloud base station.

The link between the SFN master and the SFN ANT may be implemented using network equipment from different vendors. In certain embodiments, the network equipment may not be able to deliver low latency link. A lack of low latency links, also referred to as high latency links, may prevent the SFN from working as intended. This can lead to a user equipment in the SFN losing service. Monitoring and detecting link latency, included in certain embodiments, can help to prevent this failure in the SFN.

Figure 1:
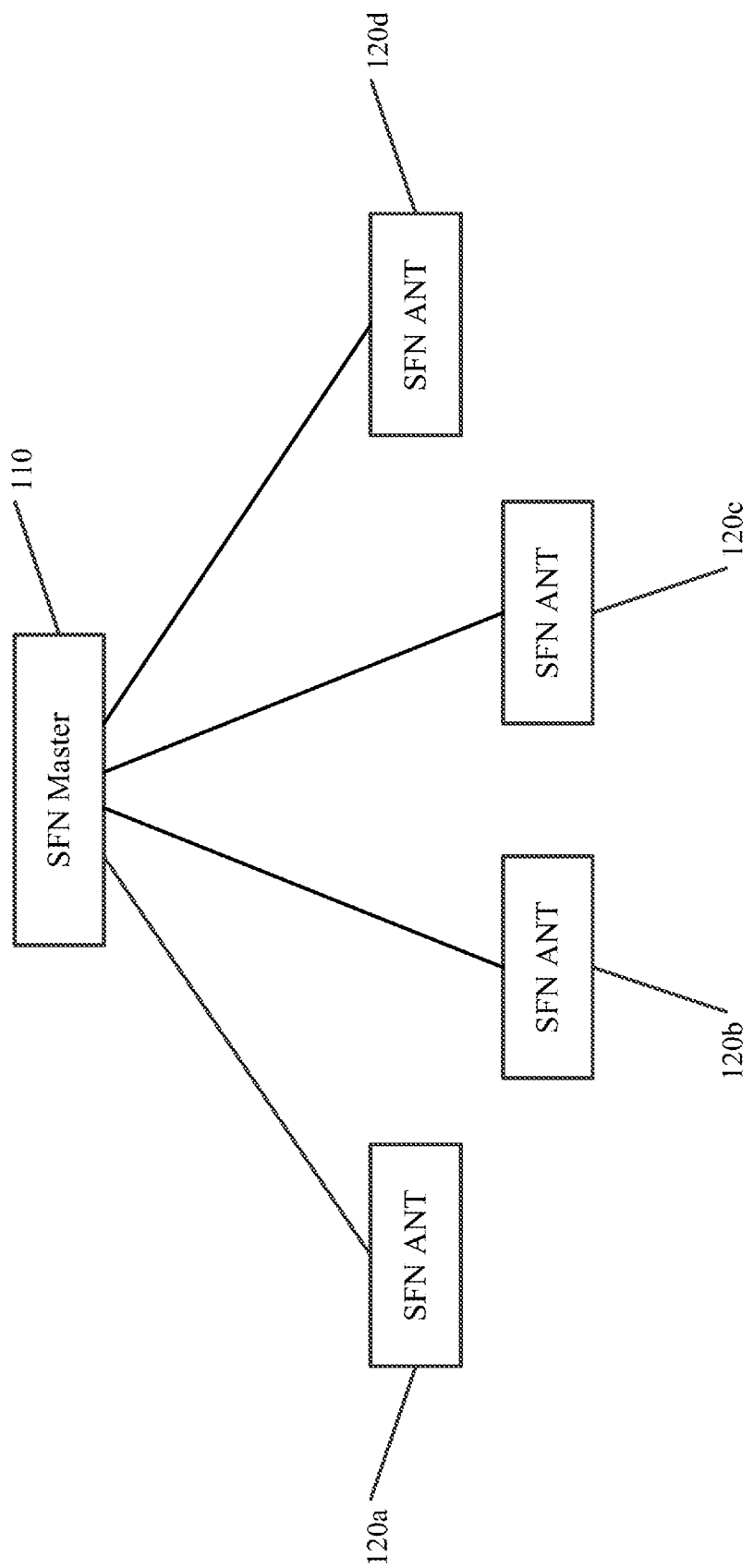
FIG. 1 illustrates a system diagram according to certain embodiments.

FIG. 1 illustrates a system diagram according to certain embodiments. Specifically, FIG. 1 illustrates an SFN in which an SFN master 110 connects to four SFN ANTs 120a, 120b, 120c, and 120d. SFN master 110 may be a standalone base station, in certain embodiments, or an access point located under a controller. SFN master 110 may also provide an interconnection between the evolved packet core (EPC), and the operation and maintenance system. SFN master 110 may be used for higher-layer and user plane processing. In some embodiments, SFN master 110 may support up to eight SFN ANTs that can be divided into one or two SFN groups. In other embodiments, any number of SFN ANTs may be supported by a single SFN master.

SFN ANTs 120a, 120b, 120c, and 120d may be picocells managed by a single SFN master 110. SFN ANTs 120a, 120b, 120c, and 120d can provide a digital interface to SFN master 110. SFN ANTs may also be responsible for physical-layer processing, as well as radio transmissions (Tx) and radio receptions (Rx). In certain embodiments, SFN ANTs may be removed from a supercell, and reconfigured as a standalone picocell or as an access point in another cell.

An aggregation switch may be used to connect the SFN ANTs and the SFN master. The aggregation switch can help to facilitate the aggregation of uplink physical layer data from the SFN ANTs to the SFN master, and multicasting of downlink physical layer data from the SFN master to the SFN ANTs.

Figure 2:
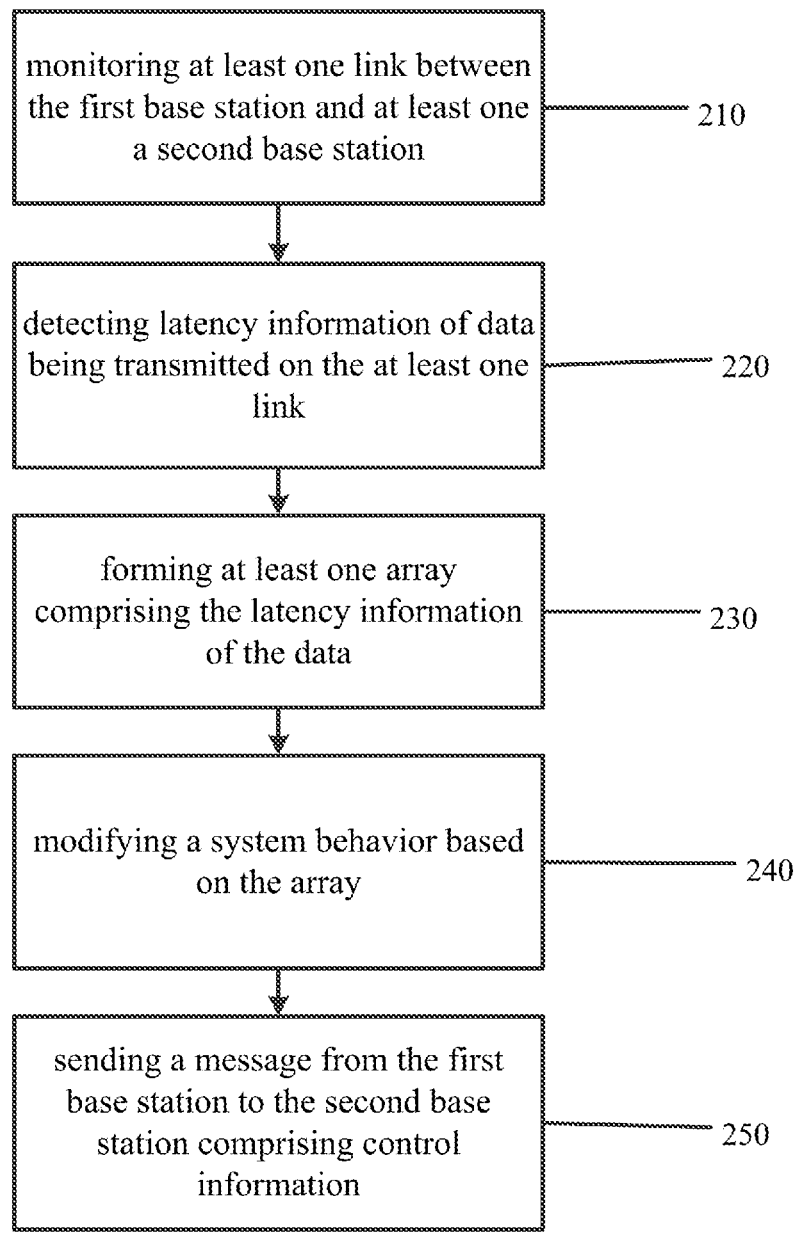
FIG. 2 illustrates a flow diagram according to certain embodiments.

FIG. 2 illustrates a flow diagram according to certain embodiments. Specifically, FIG. 2 illustrates a flow diagram from the perspective of a first base station, for example an SFN master or an SFN ANT. In such an embodiment, the first base station can receive data from one or more second base stations, for example SFN master or SFN ANT. While in some embodiments the first base station may be an SFN ANT, while the second base station may be an SFN master, in others the first base station may be an SFN master, while the second base station may be an SFN ANT. The data may be received on a link connecting the first base station and the second base station. The link between the first base station and the second base station may be wired or wireless, and can be bi-directional. In one example, the link may be an Ethernet connection, and an aggregator switch may also be used to facilitate the connection of the link.

In step 210, the first base station, for example a master SFN or an SFN ANT, may monitor the at least one link between the first base station and the at least one second base station. The first base station may monitor any and all aspects of the link, including various performance, transmission, and synchronization parameters, such as latency of the transmitted data. In an SFN, RF transmissions from base stations are transmitted over the same frequency and at the same time. In order to allow for such transmissions, a single SFN master may be connected to one or more SFN ANTs via a high speed, low latency link. In certain embodiments, the high speed may be greater than 1 gbps, and the latency may be smaller than or equal to 100 μs.

While monitoring the at least one link, as shown in step 210, the first base station may in certain embodiments detect latency of the data being transmitted on the link, as shown in step 220. In some embodiments, the first base station, for example the SFN master or the SFN ANT, can detect any level of latency. In certain other embodiments, the first base station may detect only latency that is below a maximum acceptable latency. The value of the maximum acceptable latency may be predetermined by the network operator.

Once latency is detected by the first base station, as shown in step 230, the first base station may form or create at least one array comprising latency information or latency values of the data. In certain embodiments, the array may be created in the SFN master and/or the SFN ANTs end. The array can be used to store latency information or latency values of the data, which may then be used by the first base station to modify the system behavior. While the array may take on any form, such as a graph or a table, in one particular embodiment the array may be in the form of a latency histogram. In other words, the array, and the information stored therein, may be presented as a latency histogram.

In such an embodiment, a single histogram may be kept in the form of an array where each array entry represents one latency range. In other words, the histogram may comprise the array, or latency information stored within the array. For example, if the maximum acceptable latency equals 100 μs, and the histogram accuracy is at a level of 10 μs, the following histogram can created:

histogram_X[0]—keeps the number of times when measured latency≤10 μs histogram_X[1]—keeps the number of times when measured latency>10 μs and ≤20 μs

. . .

histogram_X[8]—keeps the number of times when measured latency>80 μs and ≤90 μs histogram_X[9]—keeps the number of times when measured latency>90 μs X[0] may represent the first bin or array of the histogram, while X[1] may represent the second bin or array of the histogram. The above histogram may be available as a log and can be viewed by the first base station to monitor the latency of the link. The at least one histogram may also be used by the first base station to modify or change a system behavior relating to the first base station and/or the at least one second base station, as shown in step 240. Modifying or changing the system behavior may include any modification or change that may affect the performance of the first base station and/or the at least one second base station.

In certain embodiments, a modification of a system behavior may include decreasing the coverage of the cellular system, for example, decreasing the coverage of a cell in which the at least one second base station is located. This decrease in coverage can be achieved, for example, by taking at least one SFN ANT out of service. The SFN ANT taken out of service may be chosen because the SFN ANT may not be able to meet a latency requirement. In some embodiments, the latency requirement may be predetermined by the network operator.

Modifying or changing the system behavior can also include reducing the load on the second base station. The operator may determine how to go about reducing the load based on the array. In other embodiments, the first base station may determine based on the array to alert the network or cellular system operator of the latency of the link. Once the operator receives the alert, the operator may modify or change the system behavior. The alert may be sent to the operator via existing alarm services, for example, Simple Network Management Protocol (SNMP) traps.

Once the first base station has determined how to change or modify the system behavior, a message may be sent from the first base station, for example the SFN master, to the second base station, for example SFN ANT, as shown in step 250. In other embodiments, the message in step 250 may be sent from the SFN ANT to the SFN master. The message may include control information that includes instructions for the modification of the system behavior. The message, in certain embodiments, may be based on existing messages between various layers of the protocol stack, such as layer 1 and layer 2.

In some embodiments the messages between the first base station and the second base station may be time stamped. The time stamp in the messages may be used by the receiving side, which may be either the SFN master or the SFN ANTs, to determine the latency of the link. In other words, the timing information is sent inside the message, and the SFN master or the SFN ANTs may then create an array including information relating to the latency of the link based on the time stamp. In certain embodiments in which a plurality of SFN ANTs is provided, each SFN ANT may keep its own array including information relating to the latency of the link. In some other embodiments, in which a plurality of SFN ANTS is provided, two or more SFN ANTs may create a common array that includes latency link information from that two or more links connecting the SFN master to the two or more SFN ANTs.

Figure 3:
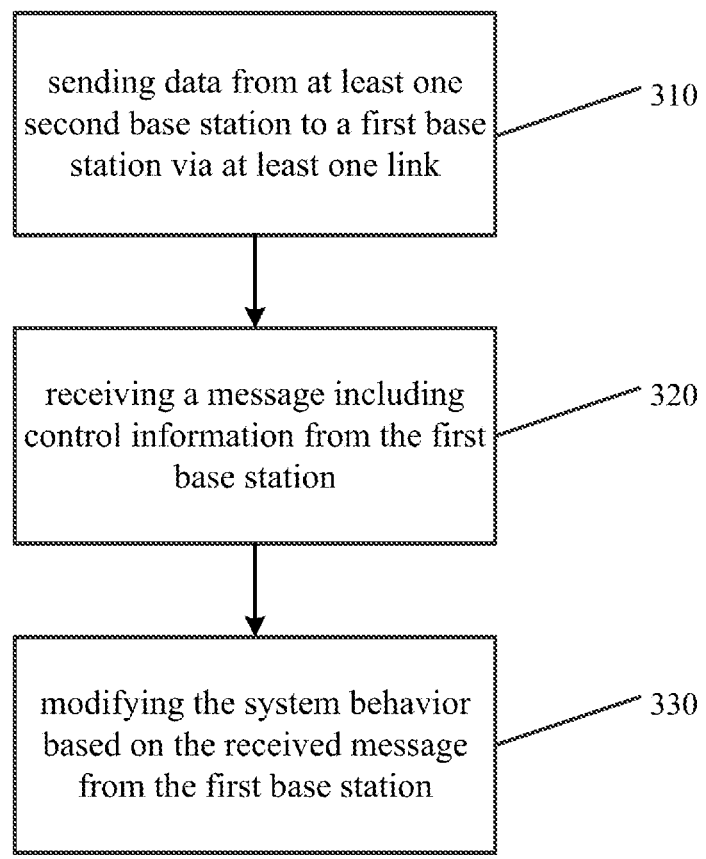
FIG. 3 illustrates a flow diagram according to certain embodiments.

FIG. 3 illustrates a flow diagram according to certain embodiments. Specifically, FIG. 3 illustrates a flow diagram from the perspective of the second base station, for example an SFN master or an SFN ANT. In step 310, the second base station sends data to a first base station via at least one link. The first base station will monitor the links and detect latency of the data being transmitted on the links, as shown in steps 210 and 220 of FIG. 2. The first base station will then form an array that includes the latency of the data, as shown in step 230, and send a message to the second base station, either the SFN master or SFN ANT, based on the array. The message can include control information that includes instructions for the modification of the system behavior.

As discussed above, the first base station may be either the SFN master or the SFN ANT. The array may therefore be formed in either an SFN master or an SFN ANT. In step 320, the second base station, for example an SFN master or an SFN ANT, can receive a message including the control information from the first base station. The second base station may then modify the system behavior based on the received message, and the control information contained therein, from the first base station, as shown in step 330.

Although many of the embodiments described herein are directed to a single frequency network, other embodiments involving other networks are possible. For example, a process of creating an array including latency information of a link, and modifying a system behavior based on the array, may also be utilized in a cloud based base station.

Figure 4:
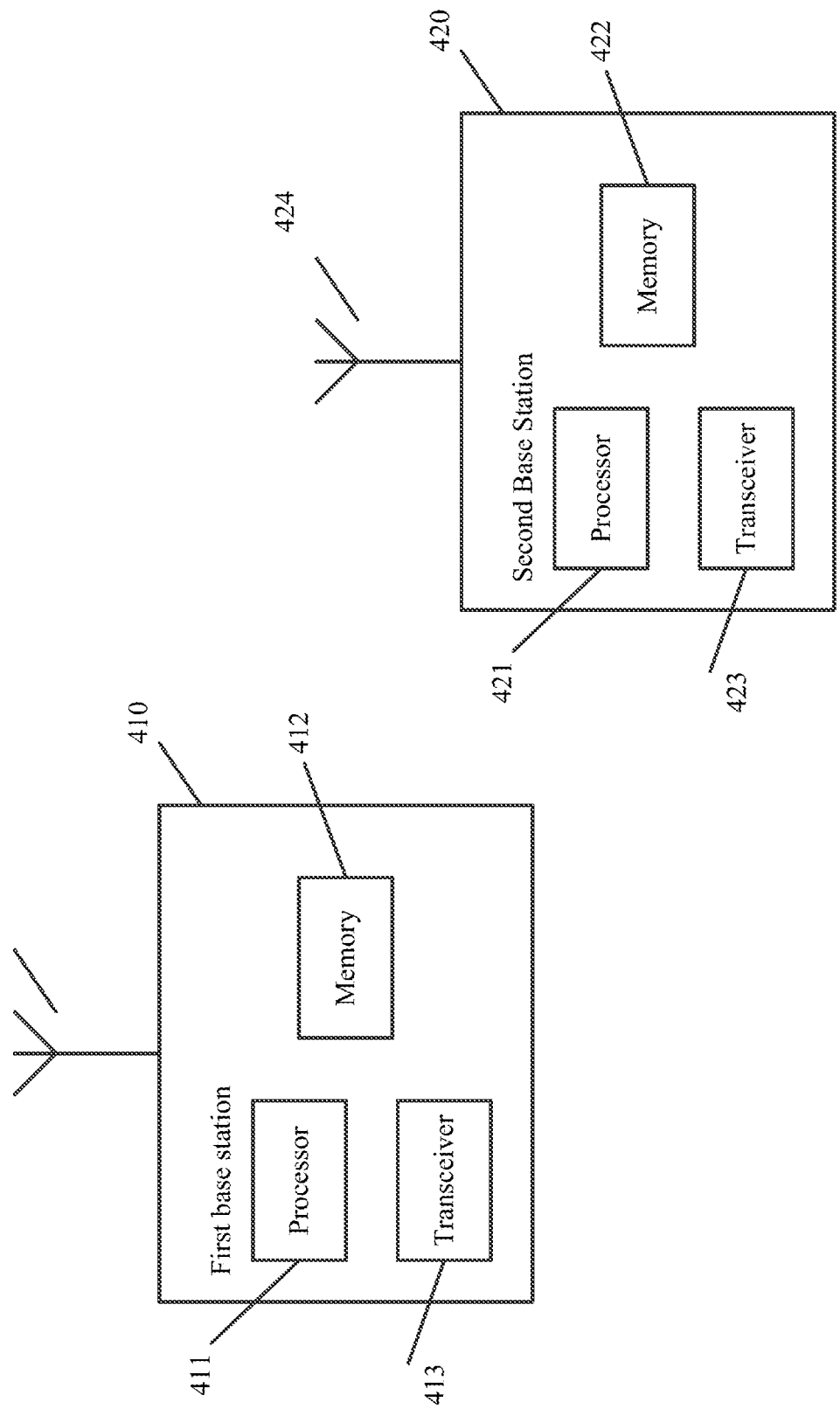
FIG. 4 illustrates a system according to certain embodiments.

FIG. 4 illustrates a system according to certain embodiments. It should be understood that each block in FIGS. 1, 2, 3 may be implemented by various means or their combinations, such as hardware, software, firmware, one or more processors and/or circuitry. In one embodiment, a system may include several devices, such as, for example, a first base station 420 or a second base station 410. The system may include more than one first base station 420 and more than one second base station 420. When first base station 410 or second base stations 420 is an SFN ANT, there may be a plurality of first base stations or second base stations.

A first base station and the second base station may be an SFN master, an SFN ANT, a network node, a picocell, a microcell, an access node, an access point, an eNodeB, server, host, an eNB for $4^{th}$ generation technology or Long Term Evolution (LTE) systems, or any of the other access or network node discussed herein. In certain embodiments, the first base station 410 and the second base station 420 may both be located in a supercell. In some embodiments, when the first base station is an SFN master the second base station may be an SFN ANT. On the other hand, when the first base station is an SFN ANT the second base station may be an SFN master.

When first base station 410 or second base station 420 is an SFN ANT, the base station may serve a user equipment or a mobile terminal. The user equipment or mobile terminal may include a processor, a memory including computer program instructions or computer code, and/or a transceiver. The user equipment may be any electronic device. For example, a user equipment may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor or a meter.

Each of first base station 410 and second base station 420 may include at least one processor or control unit or module, respectively indicated as 411 and 421. At least one memory may be provided in each device, and indicated as 412 and 422, respectively. The memory may include computer program instructions or computer code contained therein. One or more transceiver 413 and 423 may be provided, and each device may also include an antenna, respectively illustrated as 414 and 424. Although only one antenna each is shown, many antennas and multiple antenna elements may be provided to each of the devices. Other configurations of these devices, for example, may be provided. For example, second base station 420 and first base station 410 may be additionally configured for wired communication, in addition to wireless communication, and in such a case antennas 414 and 424 may illustrate any form of communication hardware, without being limited to merely an antenna.

Transceivers 413 and 423 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

In some embodiments, an apparatus, such as a first base station or the second base station, may include means for carrying out embodiments described above in relation to FIGS. 1, 2, and 3. In certain embodiments, at least one memory including computer program code can be configured to, with the at least one processor, cause the apparatus at least to perform any of the processes described herein.

According to certain embodiments, an apparatus 410 may include at least one memory 412 including computer program code, and at least one processor 411. The at least one memory 412 and the computer program code are configured, with the at least one processor 411, to cause the apparatus 410 at least to monitor at a first base station at least one link between the first base station and a second base station. The at least one memory 412 and the computer program code may also be configured, with the at least one processor 411, to also cause the apparatus 410 at least to detect latency information of data being transmitted on the at least one link between the first base station and the second base station. In addition, the at least one memory 412 and the computer program code may be configured, with the at least one processor 411, to cause the apparatus 410 at least to form an array comprising the latency information of the data. Further, the at least one memory 412 and the computer program code may be configured, with the at least one processor 411, to cause the apparatus 410 at least to modify a system behavior relating to at least the first base station or the second base station based on the array.

According to certain embodiments, an apparatus 420 may include at least one memory 422 including computer program code, and at least one processor 421. The at least one memory 422 and the computer program code are configured, with the at least one processor 421, to cause the apparatus 420 at least to send data from a second base station to a first base station via at least one link. The at least one memory 422 and the computer program code may also be configured, with the at least one processor 421, to also cause the apparatus 420 at least to receive a message including control information from the first base station. The control information includes instructions for modifying system behavior based on an array comprising latency information of data being transmitted on the at least one link.

Processors 411 and 421 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 412 and 422 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as the second base station 420 or the first base station 410, to perform any of the processes described above (see, for example, FIGS. 2 and 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

Certain embodiments discussed above allow for monitoring links, detecting latency of data being transmitted in the link, and modifying the behavior of the system based on an array created for storing the detected latency. In some embodiments involving SFN, the link being monitored may be between an SFN master and SFN ANTs.

Using the above embodiments, the operator of the cellular system may be alerted through existing alarm services about the link operating at high latency. The operator may then modify the behavior of the system to prevent such high latency, and to prevent the user equipment in the network from losing service caused by the high latency in an SFN.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. The communication systems discussed above may be implemented in Third Generation Partnership (3GPP) technology, such as LTE, LTE-advanced (LTE-A), $3^{rd}$ generation technology (3G), $4^{th}$ generation technology (4G), $5^{th}$ generation technology (5G), or any other IP Multimedia System (IMS).

Partial Glossary

EPC Evolved Packet Core
LTE Long Term Evolution
RF Radio Frequency
SFN Single Frequency Network
SFN ANT Single Frequency Network micro/picocells
SNMP Simple Network Management Protocol

We claim:

1. A method, comprising:
    detecting latency information of data being transmitted on at least one link between a first base station and at least one second base station, wherein the first base station and the at least one second base station are located in a single frequency network, and at least one of the first base station and the at least one second base station are configured for link latency monitoring in the single frequency network according to a predetermined maximum acceptable latency;
    forming at least one array comprising the latency information of the data;
    creating a latency histogram comprising the at least one array indicating at least one maximum acceptable latency; and
    modifying a system behavior relating to at least one of the first base station or the at least one second base station based on the at least one array, wherein the modifying is based on the at least one array included in the latency histogram, wherein the modifying of the system behavior comprises at least one of reducing a load on the at least one second base station, alerting an operator of the latency of the link, or decreasing a coverage of a cell in which the at least one second base station is located.

2. The method according to claim 1, further comprising:
    monitoring at the first base station the at least one link between the first base station and the at least one second base station.

3. The method according to claim 1, wherein each of the at least one array represents a range of the latency of the data in the at least one link.

4. The method according to claim 1, wherein the first base station or the at least one second base station is a single frequency network master.

5. The method according to claim 1, wherein a plurality of the at least one second base station operate in a cell, and wherein the decreasing of the coverage of the cell comprises taking at least one of the plurality of the at least one second base stations out of service.

6. The method according to claim 1, wherein the first base station and the at least one second base station are time synchronized to each other.

7. The method according to claim 6, wherein the time synchronization has a maximum difference of four microseconds.

8. A computer program product embodied on a non-transitory computer-readable medium encoding instructions which, when executed in hardware, cause the hardware to perform a process according to claim 1.

9. A method, comprising:
    sending data from at least one second base station to a first base station via at least one link, wherein the first base station and the at least one second base station are located in a single frequency network configured for link latency monitoring, and at least one of the first base station and the at least one second base station are configured for link latency monitoring in the single frequency network according to a predetermined maximum acceptable latency;
    receiving a message including control information from the first base station, wherein the control information includes instructions for modifying system behavior based on at least one array associated with a latency histogram comprising latency information of the data sent on the at least one link indicating at least one maximum acceptable latency; and
    modifying the system behavior based on the received message from the first base station, wherein the modifying is based on the at least one array included in the latency histogram, wherein the modifying of the system behavior comprises at least one of reducing a load on the at least one second base station, alerting an operator about the latency of the link, or decreasing a coverage of a cell in which the at least one second base station is located.

10. The method according to claim 9, wherein the first base station or the at least one second base station is a single frequency network master.

11. An apparatus, comprising:
- at least one processor; and
- at least one memory including computer program code,
- wherein the at least one memory and the computer program code are configured to, with the at least one processor, cause the apparatus at least to perform
- detecting latency information of data being transmitted on at least one link between a first base station and at least one second base station, wherein the first base station and the at least one second base station are located in a single frequency network configured for link latency monitoring, and at least one of the first base station and the at least one second base station are configured for link latency monitoring in the single frequency network according to a predetermined maximum acceptable latency;
- forming at least one array comprising the latency information of the data;
- create a latency histogram comprising the at least one array indicating at least one maximum acceptable latency; and
- modifying a system behavior relating to at least one of the first base station or the at least one second base station based on the at least one array, wherein the modifying is based on the at least one array included in the latency histogram, wherein the modifying of the system behavior comprises at least one of reducing a load on the at least one second base station, alerting an operator of the latency of the link, or decreasing a coverage of a cell in which the at least one second base station is located.

12. The apparatus according to claim 11, wherein the at least one memory and the computer program code are further configured to cause the apparatus to monitor, at the first base station, the at least one link between the first base station and the at least one second base station.

13. The apparatus according to claim 11, wherein each of the at least one array represents a range of the latency of the data in the at least one link.

14. An apparatus, comprising:
- at least one processor; and
- at least one memory including computer program code,
- wherein the at least one memory and the computer program code are configured to, with the at least one processor, cause the apparatus at least to perform
- sending data from at least one second base station to a first base station via at least one link, wherein the first base station and the at least one second base station are located in a single frequency network configured for link latency monitoring, and at least one of the first base station and the at least one second base station are configured for link latency monitoring in the single frequency network according to a predetermined maximum acceptable latency;
- receiving a message including control information from the first base station, wherein the control information includes instructions for modifying system behavior based on at least one array associated with a latency histogram comprising latency information of the data sent on the at least one link indicating at least one maximum acceptable latency; and
- modifying the system behavior based on the received message from the first base station, wherein the modifying is based on the at least one array included in the latency histogram, wherein the modifying of the system behavior comprises at least one of reducing a load on the at least one second base station, alerting an operator about the latency of the link, or decreasing a coverage of a cell in which the at least one second base station is located.

15. The apparatus according to claim 14, wherein the first base station or the at least one second base station is a single frequency network master.

* * * * *